United States Patent [19]

Morduch et al.

[11] Patent Number: 5,463,684
[45] Date of Patent: Oct. 31, 1995

[54] TELECOMMUNICATIONS SYSTEM FOR TRANSFERRING CALLS WITHOUT A PRIVATE BRANCH EXCHANGE

[75] Inventors: Georg E. Morduch, Alexandria, Va.; Alvin O. Parkinson; Thomas S. Urso, Jr., both of Gaithersburg, Md.

[73] Assignee: Microlog Corporation, Germantown, Md.

[21] Appl. No.: 145,122

[22] Filed: Nov. 3, 1993

[51] Int. Cl.⁶ ................................................ H04M 3/56
[52] U.S. Cl. .......................... 379/202; 379/201; 379/203; 379/204; 379/205; 379/212
[58] Field of Search ........................... 379/201, 202, 379/203, 204, 205, 206, 207, 34, 92, 218, 134, 196, 88, 67, 213, 158, 211, 157, 165, 94, 280, 373, 142, 279

[56] References Cited

U.S. PATENT DOCUMENTS

| | | | |
|---|---|---|---|
| 4,303,804 | 12/1981 | Johnson et al. | 379/204 |
| 4,544,804 | 10/1985 | Herr et al. | 379/204 |
| 4,797,910 | 1/1989 | Daudelin | 379/67 |
| 4,937,856 | 6/1990 | Natarajan | 379/158 |
| 4,943,995 | 7/1990 | Daudelin et al. | 379/67 |
| 4,959,855 | 9/1990 | Daudelin | 379/213 |
| 5,125,023 | 6/1992 | Morduch et al. | 379/88 |
| 5,291,548 | 3/1994 | Tsumura et al. | 379/204 |
| 5,297,197 | 3/1994 | Katz | 379/205 |
| 5,321,744 | 6/1994 | Madonna et al. | 379/279 |

Primary Examiner—Jeffery A. Hopsass
Assistant Examiner—Scott Wolinsky
Attorney, Agent, or Firm—Roylance, Abrams, Berdo & Goodman

[57] ABSTRACT

A telecommunications system is configured using a personal computer (PC) and voice processing boards in its expansion slots. The boards have ports to interface with telephone lines. The PC is programmed to establish telephone connections between the system and a caller on a first telephone line and between the system and an operator on a second telephone line. The PC associates channels A and B with the ports connected to the first and second lines, respectively. Before transferring the call, the system plays different pre-recorded messages to the caller and the operator. The system transfers the call on the first line to the second line by conferencing them so that the caller and operator can converse. The system operates in listen-only mode to detect operator touch tones which provide the telephone number of a called party and commands to end or begin conferencing. The PC subsequently establishes a telephone connection between the system and the called party on a third telephone line, or on the second line if the operator has hung up. The PC then conferences the first and the third or second line by transferring the call between the system and the called party to the caller so that the called party and the caller can speak to one another while the system is in a listen-only mode. The PC is also programmed to monitor the duration of timed calls.

28 Claims, 12 Drawing Sheets

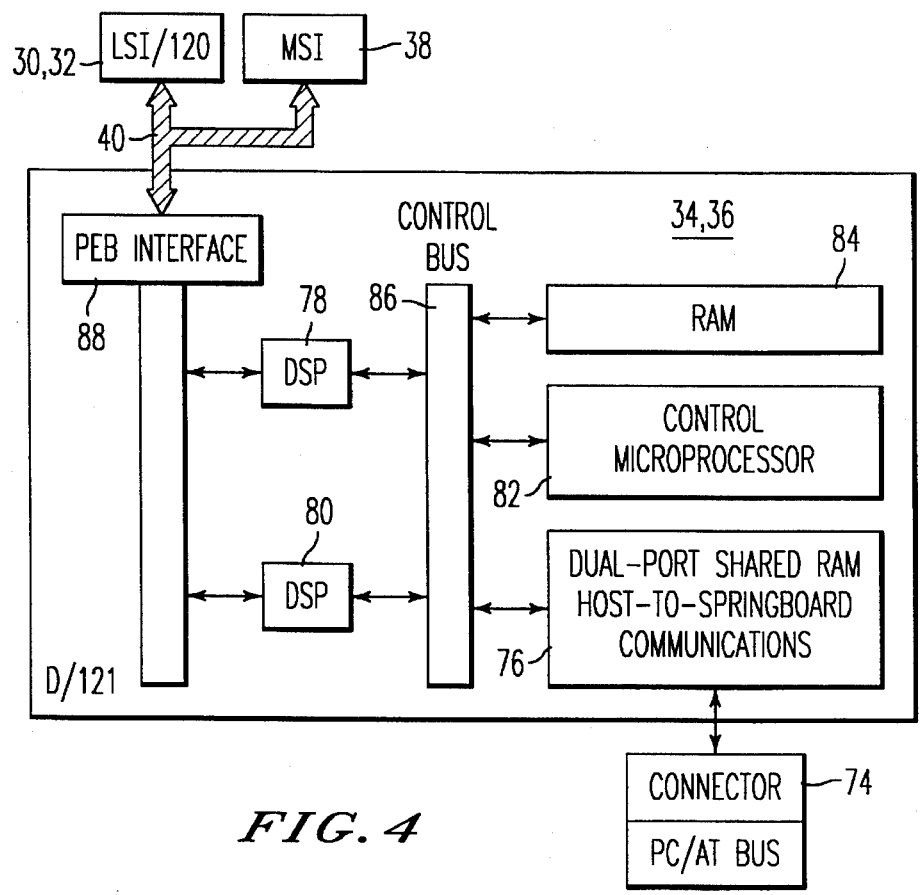
FIG. 4
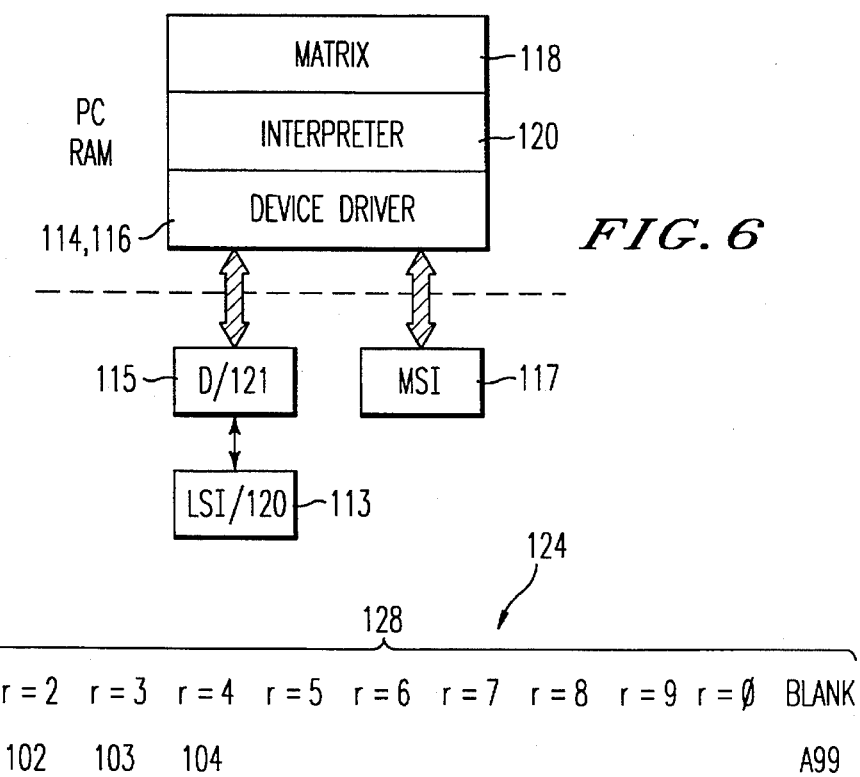
FIG. 6
FIG. 7

(CHANNEL A)

(CHANNEL B)

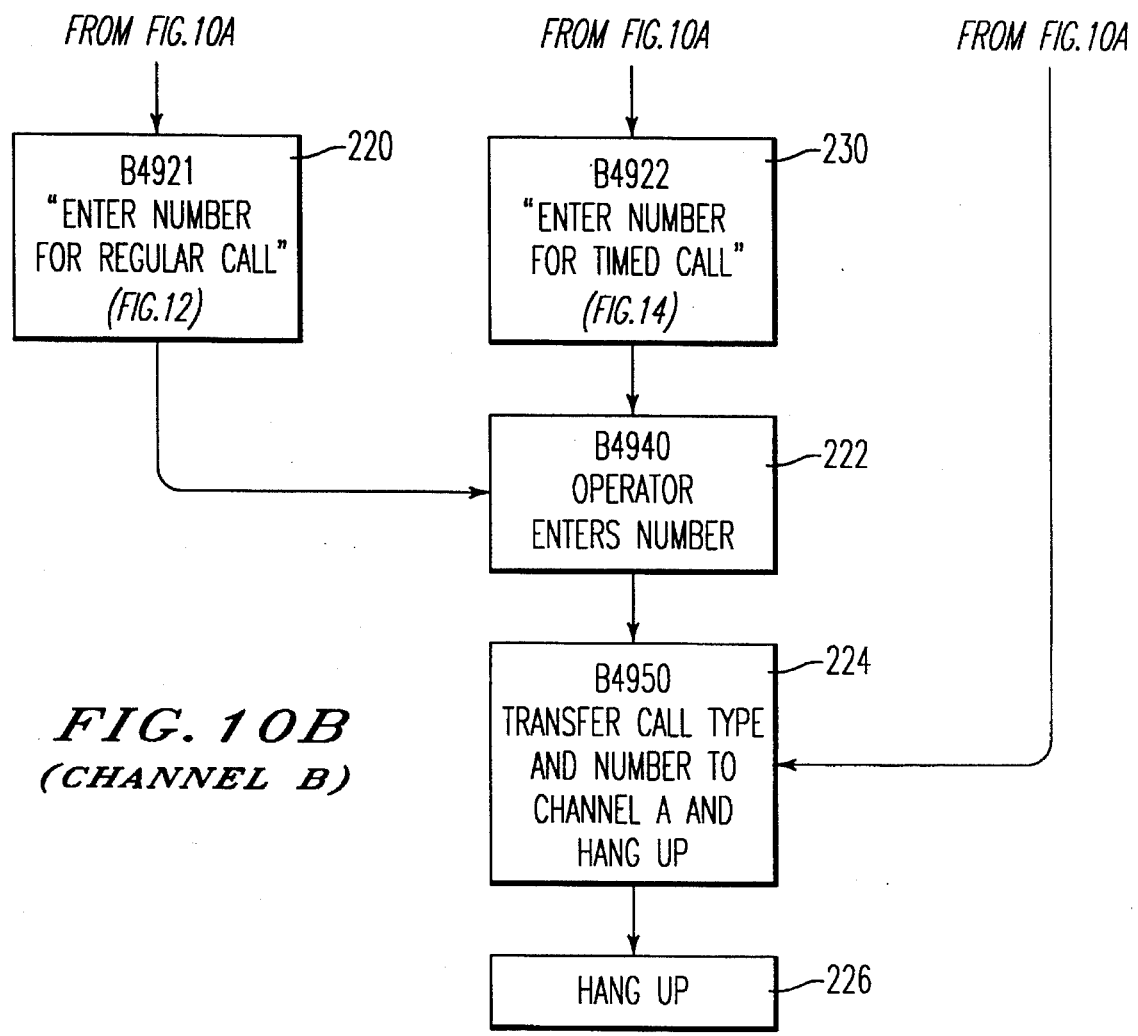

(CHANNEL A)

(CHANNEL B)

(CHANNEL A)

(CHANNEL B)

5,463,684

TELECOMMUNICATIONS SYSTEM FOR TRANSFERRING CALLS WITHOUT A PRIVATE BRANCH EXCHANGE

REFERENCE TO MICROFICHE APPENDIX

Reference is made to the microfiche appendix which contains 1 sheet representing 12 frames of the matrix commands and code.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The invention relates to a telecommunications system and in particular to an automated directory attendant system wherein a call can be transferred to either a remote or local operator. The operator can subsequently route the call to a final destination. A private branch exchange (PBX) is not required for these call transfers.

2. Discussion of the Related Art

Due to the powerful processing capability of the microprocessor, personal computers (PC) can be configured to provide an increasing variety of telecommunications applications. The PC is therefore becoming an inexpensive substitute for conventional and oftentimes more costly telecommunications equipment such as a private branch exchange (PBX). By incorporating at least one voice processing board into a PC, and programming the PC and voice board with appropriate software, the personal computer can provide users with voice mail, pre-recorded messages, automatic call transfer, access to different databases, interactive voice response, and speech recognition, among other telecommunications features.

While many businesses and government institutions are modernizing their telecommunications systems with more powerful switches and with digital voice and data communication networks, a significant number of private and public concerns continue to use their existing analog telephone systems. For instance, many military bases use human operators to complete subsidized telephone calls from military personnel to their families. These calls are typically called "health and welfare" calls and are limited in duration. The operator has the capability of disconnecting the calling parties when the time limit is exceeded. During off-peak hours, the staff of operators can be reduced. Considerable cost savings can be achieved, in some cases, by replacing the staff on base with off-site operators dedicated to processing off-peak calls for a number of different bases and/or businesses.

Prior telecommunications switching systems are not configured to transfer a call from a first line to a second line (i.e., to establish call conferencing between a caller and an operator), and then subsequently to release the second line in order to complete a call between the first line and the second or a third line (i.e., to establish call conferencing between the caller and a selected destination party). For example, many PBXs do not allow release of the second line alone without also releasing the first line, nor the reassignment of the second line for use by the destination party in lieu of a third line.

SUMMARY OF THE INVENTION

The telecommunications system of the present invention allows callers to be transferred to an operator, who can then route the telephone call to its final destination without using a private branch exchange.

The telecommunications system is a personal computer (PC) that is provided with a number of voice processing boards in its expansion slots for interfacing a plurality of telephone lines to the PC. The PC is programmed to answer an incoming line on a first line, and to establish a call on a second line to an operator, the number for whom is stored in a PC RAM file. A message can be played to the caller on the first line while the call to the operator is being completed on a second line because each line interfaced with the PC is associated with a separate processing channel.

The PC can conference the caller and the operator on the first and second lines using a modular station interface (MSI) board in one of the expansion slots. The PC is programmed to establish conferencing via handshaking signals sent from a channel B corresponding to the second line to a channel A corresponding to the first line. The PC does not play messages on channel A without first deconferencing it. The operator can obtain data from the caller, while the first and second lines are conferenced, which is stored in PC RAM.

The PC is programmed to establish a call on a third line, or on the second line if the operator has hung up, using the stored data received from the caller. The third line and the first line are subsequently conferenced.

The separate processing channels associated with each telephone line are useful to play a message to a caller while his call is being transferred to another line, or to play different messages on two associated channels (i.e., channels A and B) when they are deconferenced. Further, the duration of the conferencing between two channels can be monitored and restricted for timed calls.

BRIEF DESCRIPTION OF THE DRAWINGS

These and other features and advantages of the present invention will be more readily apprehended from the following detailed description when read in connection with the appended drawings, in which:

FIG. 4 is a block diagram of a voice communication (D/121) board;

FIG. 6 is a schematic diagram of software modules used to implement the present invention;

FIG. 7 is a schematic diagram of an instruction line used in the matrix software of the present invention;

FIGS. 9, 10A and 10B are flowcharts depicting the sequence of operations for call processing events associated with inbound and outdial channels, respectively, when rendering operator assistance in accordance with the present invention;

DETAILED DESCRIPTION OF THE PREFERRED EMBODIMENTS

Figure 1:
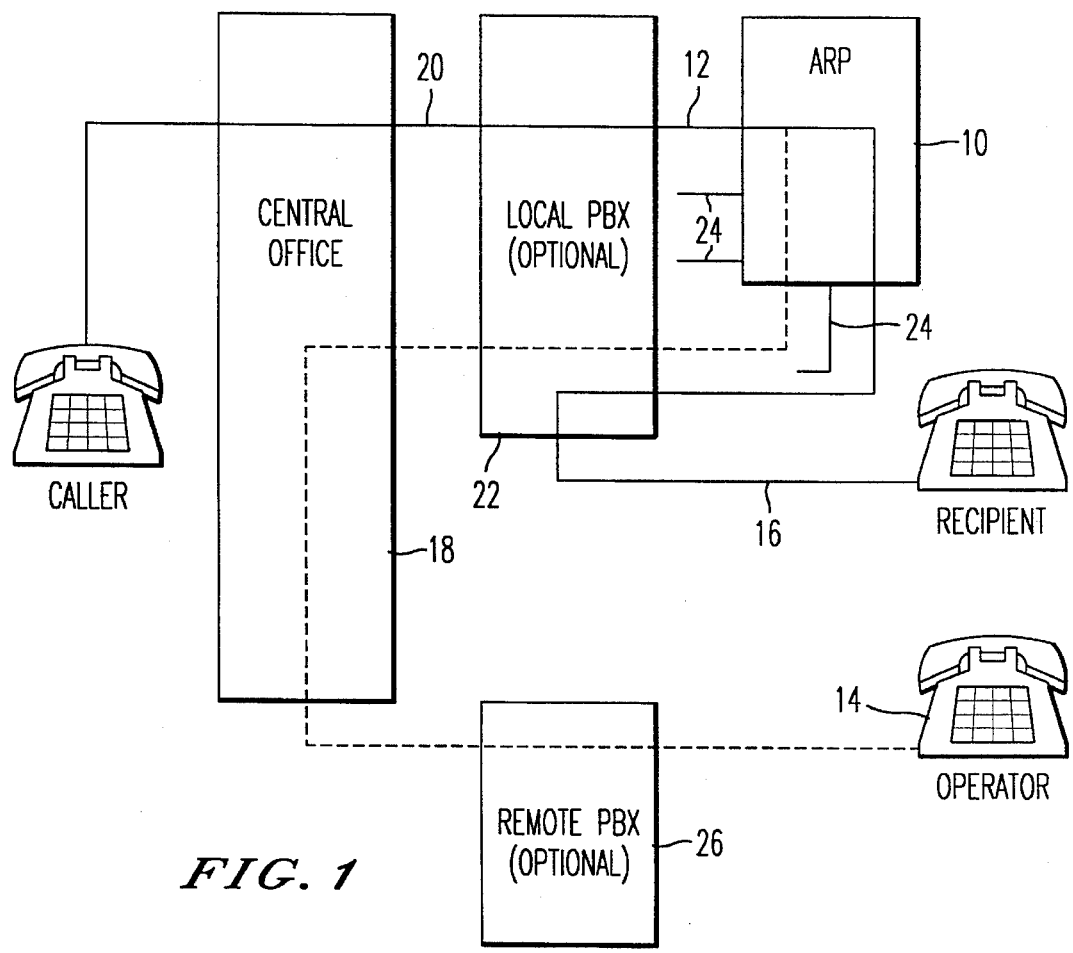
FIG. 1 is a schematic diagram of a telecommunication system incorporating an audio response processor (ARP) constructed in accordance with the present invention.

FIG. 1 depicts a telecommunications system which incorporates an audio response processor (ARP) 10 constructed in accordance with the present invention. The ARP preferably comprises a personal computer such as an IBM PC-AT or other compatible computer. The ARP further comprises a number of voice processing boards which are inserted into the expansion slots of the PC. The voice processing boards are described in further detail below with reference to FIGS. 2 through 5.

In accordance with the present invention, the personal computer and the voice processing boards are programmed to allow a call on an inbound line 12 to the ARP 10 to be transferred to an operator 14, who then routes the call to its final destination along an outbound line 16. For example, military personnel can call into a central office (CO) 18 of the public telephone system using rotary dial pulses or DTMF tones representing the telephone number of operator assistance at a local military base. The central office 18 in turn locates an available trunk 20 to the ARP 10 on the military base. The ARP 10 and a call recipient can both be connected to a private branch exchange (PBX) 22, and therefore receive calls through a CO or PBX. The ARP is programmed in accordance with the present invention to find an available line 24 and to enter the telephone number of an operator in order to establish a telephone connection with the operator. The operator can be co-located with the ARP or can be at a remote site. Further, the operator can be interfaced with the ARP 10 via a remote PBX 26. The PBXs 22 and 26 are optional. They are not required to conference a caller with an operator, or to subsequently conference the caller with a call recipient following the release of the trunk connecting the caller and the operator. The ability to perform these call conferences without a PBX is one of the advantages of the present invention.

Figure 2:
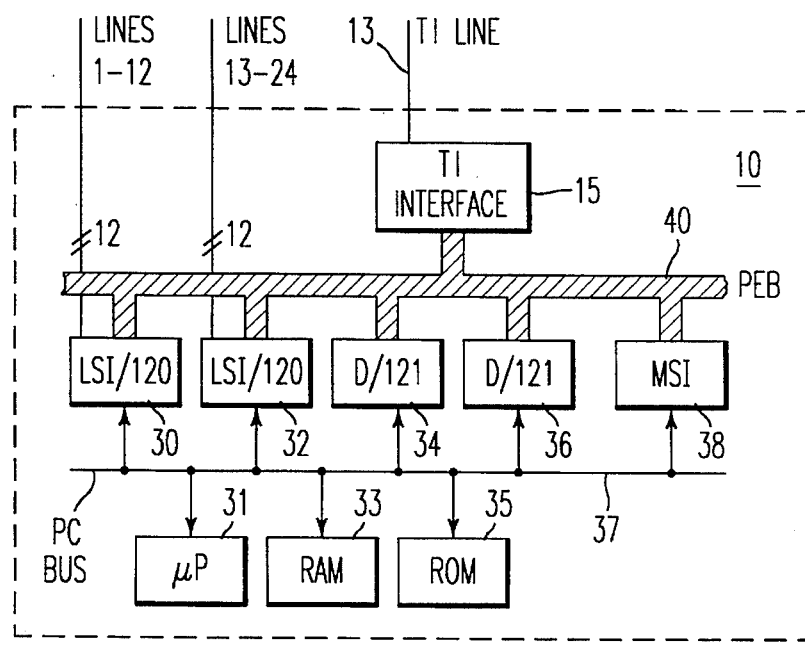
FIG. 2 is a block diagram of the ARP constructed in accordance with the present invention.

FIG. 2 depicts the individual voice processing boards which are provided in the expansion slots (not shown) of the PC which constitutes the ARP 10 in the preferred embodiment. The ARP preferably comprises a microprocessor 31, random access memory 33, read-only memory 35, at least one loop start interface (LSI) board 30 or 32, at least one voice communication processing board 34 or 36, and at least one modular station interface (MSI) board 38. With only one LSI board and one voice communication board, the system can process as many as six call transfers. For illustrative purposes, the invention is described as using two LSI boards 30 and 32, and two voice communication boards 34 and 36 (which are preferably Dialogic model D/121 boards). Lines 1 through 12 are processed by LSI and voice communication boards 30 and 34. Lines 13 through 24 are processed by LSI and voice communication boards 32 and 36. These voice processing boards 30, 32, 34, 36 and 38 are coupled to the PC bus 37 by conventional PC bus connectors (not shown). The boards are also interconnected to each other via an expansion bus 40 carrying pulse code modulated (PCM) data, which is hereinafter referred to as a PEB. Lines from conventional analog telephone sets are interfaced with the ARP 10 through the LSI boards 30 and 32. A T-1 line 13 can be interfaced to the PEB 40 via a T-1 interface board 15. The invention can be configured for use in Europe by substituting a different interface board, i.e., an E-1 board.

The present invention is preferably implemented using LSI, MSI and (D/121) voice communication processing boards manufactured by Dialogic Corporation in Parsippany, N.J. It is to be understood, however, that the scope of the invention is not limited to the use of particular type(s) of voice processing boards.

Figure 3:
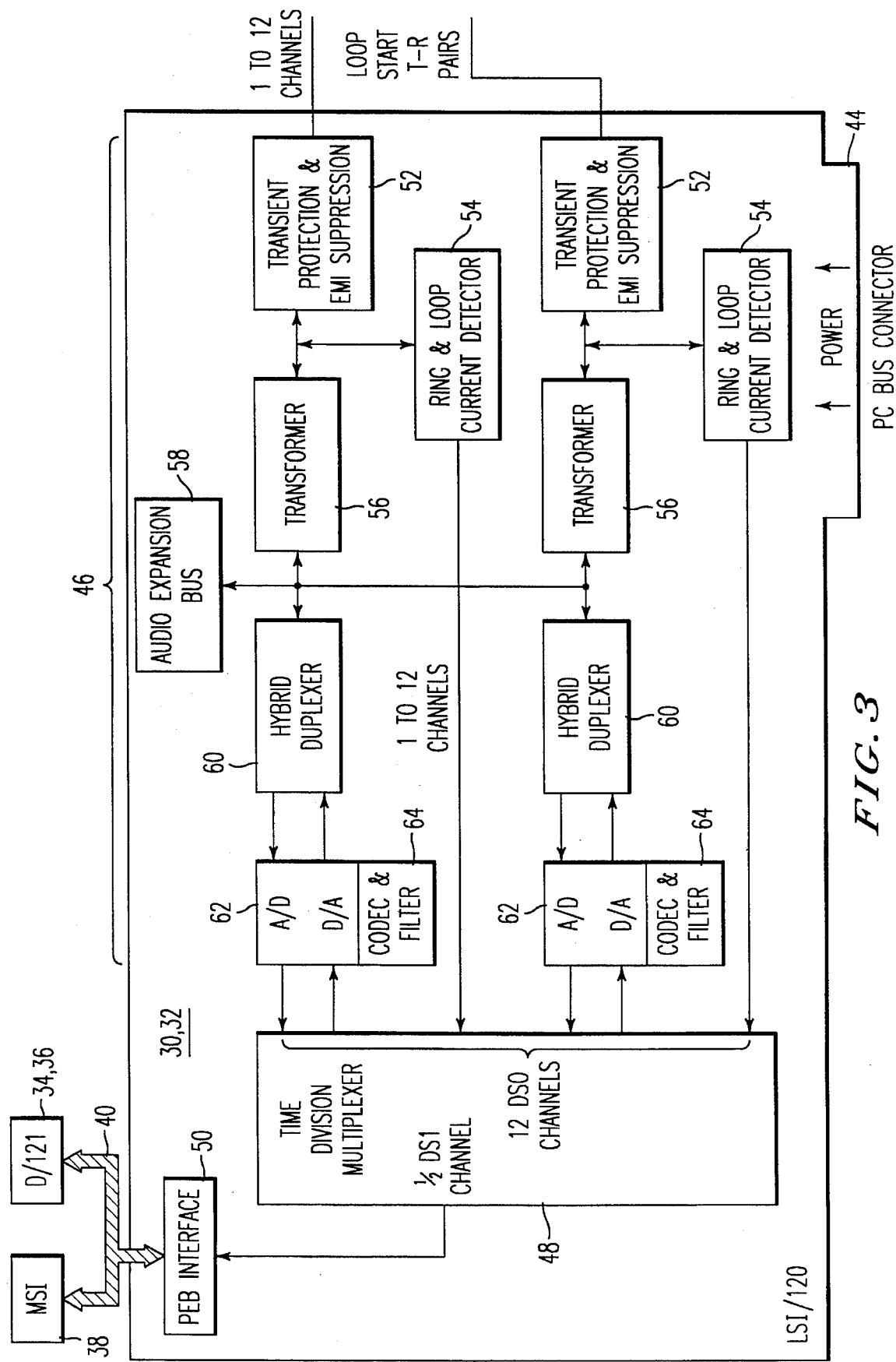
FIG. 3 is a block diagram of a loop start interface (LSI) board.

FIG. 3 is a block diagram of the LSI board 30. The LSI board 32 has identical hardware. The LSI boards 30 and 32 are preferably Dialogic Model LSI/120 boards. An LSI/120 board is a PC-compatible board which is configured to interface twelve analog telephone lines to Dialogic models of the voice communication processing boards 34 or 36 via the PEB 40. The LSI/120 board comprises a PC bus connector 44, line circuitry 46 for each of twelve channels or loop start tip and ring (T-R) pairs, a time division multiplexer (TDM) 48, and a PEB interface 50. The line circuitry 46 for each T-R pair comprises a transient protection device 52, a ring and loop current protector 54, a transformer 56, an audio expansion bus 58, a hybrid duplexer 60, a converter 62 for converting analog signals to digital and vice-versa, and a codec 64.

With reference to FIG. 2, as many as twenty-four individual telephone stations can be interfaced with the voice processing boards 34 and 36 and the PEB 40 via the two LSI boards 30 and 32. Alternatively, as many as 24 digital telephones can be coupled via a T-1 interface board 15 to the ARP by a 1.544-Megabytes per second T-1 line 13 having 24 64-kilobytes per second channels.

FIG. 4 depicts the voice communication processing board 34. The other voice communication processing board 36 has identical hardware. The board 34 is preferably a Dialogic model D/121 board. The D/121 board is a twelve-channel expansion board which is coupled to the PC/AT bus by a conventional bus connector 74. Host-to-springboard communication between the PC and the D/121 board is facilitated by a dual-port shared random access memory (RAM) 76. The D/121 board employs digital signal processors (DSPs) 78 and 80 to implement such voice processing features as recording, digitizing and compressing audio signals in real time, playing back previously recorded files, initiating and receiving calls through an LSI/120 board, monitoring the progress of an outbound call, and detecting and generating dial pulses and dual-tone, multi-frequency (DTMF), MF, R2 MF, and Socotel signals, as well as user-defined signals (i.e., Global Tone Detection and Generation).

With further reference to FIG. 4, a microprocessor 82 operates in accordance with Dialogic firmware (known as SpringWare), which is downloaded into a RAM 84 during software installation. The microprocessor 82 communicates with the DSPs 78 and 80 via a control bus 86. The D/121 board 34 is coupled to the PEB 40 by a PEB interface 88. The D/121 boards 34 and 36 each receive digital data and control information from LSI/120 boards 30 and 32, respectively, which couple the D/121 boards to the telephone network. The data and control information is passed via the PEB 40 to the DSPs 78 and 80. The DSPs provide signal analysis on the incoming bitstream and, together with the microprocessor 82, perform a number of functions. These functions include but are not limited connecting up to 24 voice or data channels to the PEB 40.

It should be understood that the D/121 board belongs to a generation of Dialogic products whose capabilities are defined primarily by software rather than by the components on the expansion board. Device drivers have been developed by Dialogic to interface the PC with other Dialogic boards such as the D/121 and the MSI boards, and to control them. The software of the present invention, which is described in further detail below, provides a higher level of program control which invokes selected device driver functions as needed.

Figure 5:
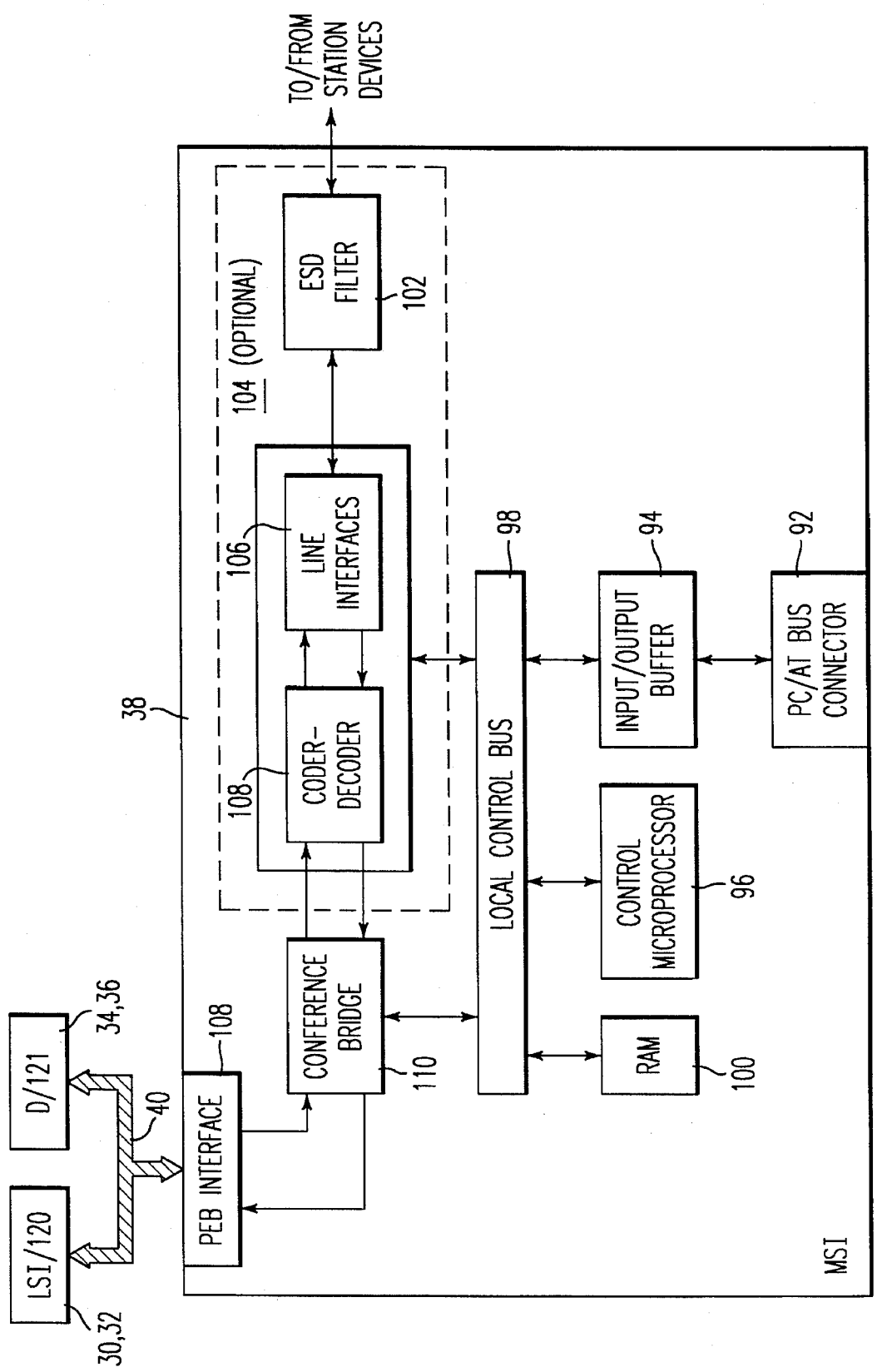
FIG. 5 is a block diagram of a modular station interface (MSI) board.

The MSI board is depicted in FIG. 5. The MSI board interfaces with the host PC via a bus connector 92 and an input/output (I/O) buffer 94. A microprocessor 96 interprets and executes commands from the PC and controls board functions via a local control bus 98. Firmware to control the microprocessor 96 is downloaded from a PC disk file to a local RAM 100 at the time of system initialization. The MSI board can be optionally equipped with one to four MSI daughterboards 104. As shown in FIG. 5, each daughterboard comprises an electrostatic discharge (ESD) filter 102, subscriber line interface circuits (SLICs) 106 and a coder/decoder (CODEC) 108 to provide loop-start battery and analog/digital data conversion, respectively, to connect local station devices thereto. In accordance with the present invention, the LSI/120 boards 30 and 32 are used in lieu of daughterboards to interface station devices to the PEB 40 because of their utility in transferring calls to remotely located call recipients. The PEB interface 108 routes PEB time slots to and from the LSI/120 boards 30 and 32, the D/121 boards 34 and 36 and the MSI board 38. The conference bridge 110 enables a user, or a programmed application such as that contemplated by the present invention, to establish conferences between any of the time slots present on the PEB and the station devices connected to the LSI/120 boards 30 and 32. In accordance with the present invention, conferencing primarily refers to connecting two parties via the PEB, although the Dialogic boards can conference more than two parties.

The PC-based teleconferencing system of the present invention operates in accordance with several levels of programmed control which shall be discussed generally with reference to FIG. 6. The PC, and the LSI/120, D/121 and MSI boards (FIG. 2) have each been provided with firmware 113, 115 and 117, respectively, by their manufacturers for setting the hardware configurations of these devices during initialization. In addition, D/121 and MSI boards operate in accordance with device drivers 114 and 116, respectively, stored in PC RAM 33. The device drivers interface the PC with the D/121 and MSI boards by providing a number of library functions for controlling the board hardware. The LSI/120 boards are essentially passive devices, that is, the PC has no corresponding device driver for them. Instead, the LSI/120 boards operate in conjunction with the programmed control of their respective D/121 boards.

Users design D/121 and MSI board applications by creating programs using a higher level language such as C or PASCAL. These programs instruct the PC microprocessor 82 to invoke selected library functions via function calls to the device drivers 114 and 116. Library functions for the D/121 boards provide the host PC with such hardware resources as monitoring the process of an outbound call, initiating and receiving calls through the LSI/120 boards, and recording, digitizing, compressing and playing back audio signals. Library functions for the MSI boards provide the host PC with conference management functions. Further, the library functions of the D/121 and MSI boards provide configuration, management and diagnostic functions to enable the PC to set MSI and D/121 device parameters, as well as to stop, start and test the MSI and D/121 boards.

With continued reference to FIG. 6, the PC of the present invention is controlled in accordance with a software matrix 118 which preferably resides on a hard drive in the PC. The matrix preferably comprises, but is not limited to, the software matrix developed by Microlog Corporation of Germantown, Md. for its VCS 3500 system. The VCS 3500 system is a personal computer-based system that can be programmed to answer incoming telephone calls and initiate outgoing calls, to process voice or DTMF signal responses from callers, and to play selected prerecorded messages to callers based on caller responses, among other system functions. The ports associated with the VCS 3500 system generally appear to an existing office telephone system as analog telephone sets.

The software matrix allows an application programmer to design application programs for implementing a call processing system that is unique to the organization requiring telephone services. When using a matrix to create an application program, the application programmer enters instructions for the PC into a row-and-column grid of cells. Each row represents a separate step in the application program. Each column in the grid can have different meanings depending on the activity defined by the row, as discussed in more detail below. As shown in FIG. 6, an interpreter 120 for the matrix transforms each row or instruction line into appropriate commands that are intelligible to the host PC microprocessor 31. For example, the interpreter can convert a line of instructions for establishing a conference between an incoming and an outgoing line into a function call to the device driver for the MSI board.

The matrix program will first be described generally in connection with FIG. 7. A discussion of the matrix commands created specifically for implementing the present invention follows. A single matrix line 124 is shown in FIG. 7. The host PC executes the instruction in the Current Event column 126. For example, column 126 may contain an instruction to play a message to a caller which prompts the caller to respond by depressing a numbered key on the telephone set. The remaining columns 128 (i.e., r=1, r=2 through blank) may contain a matrix line number such as 101 in column r=1 or 102 in column r=2 to which the PC microprocessor 31 will branch upon receiving a "1" or "2" response tone from the caller. If the caller depresses the wrong key, the PC is programmed to operate in accordance with the entry in the column. A three digit number in the matrix corresponds to a message stored in PC memory which can be played to the caller. Entries beginning with G, A or B refer to system messages. Thus, if the caller in the above example fails to enter a digit between 1 and 4 (i.e., the caller enters 5, 6, 7, 8, 9, or 0), then an error message is played. If the caller presses "#" or "*", then a message corresponding to message number A99 (Blank) is transmitted to the caller.

The VCS 3500 system presently has over one hundred matrix commands for transferring calls, manipulating data, performing logical operations, and implementing a voice mail system, among other functions. These commands are listed in the microfiche appendix. The matrix commands for outdialing, conferencing and deconferencing, important features of the present invention, are listed separately in Table 1.

TABLE 1

RLT MATRIX COMMANDS

| Command | Subcommand |
|---------|------------|
| OUTD | ON |
| OUTD | OFF |
| LINK | ON |
| LINK | OFF [i] |
| LINK | X [source] [z-switch] [stop] |
| IDLE | |

The OUTD ON command is issued by the caller's channel (channel A). The command requests a port or line for outdialing. If a port is found, the channel corresponding to the port (channel B) becomes associated with the caller's channel. The two channels A and B remain associated until either one of them hangs up, or and OUTD OFF command is issued. The OUTD ON command specifies a Z-switch (ZCOM) for communication between the associated channels A and B. The Z-switches are channelized (i.e., each channel has its own set of switches) software flags which are set by matrix commands. Z-switches may be used to control flow of events. The OUTD ON command selects a channel parameter block for call progress, and a put-on-hold string, which are both described in further detail below, for getting a dial tone.

The OUTD OFF command is issued by the outdial channel (channel B) to copy the value of a Z-switch from the outdial channel to the caller's channel, and to copy the outdial channel tone buffer containing the telephone number to the caller's tone buffer. The OUTD OFF command can remove the caller's channel from a CONFERENCE mode and disassociate the caller's channel from the outdial channel.

The LINK ON command is issued from the caller's channel to copy the value of a Z-switch from the caller's channel to the outdial channel. The caller's channel thereafter enters a CONFERENCE mode. The LINK ON command is issued from the outdial channel in order to instruct the MSI board 38 to start conferencing.

The LINK OFF command is issued from the outdial channel to instruct the MSI board 38 to suspend conferencing. If i=1, then the caller's channel is forced out of the CONFERENCE mode.

The LINK X command copies a value (i.e., source) to a Z-switch on the associated channel. If stop=st, the LINK X command causes a CHANNEL STOP to the associated channel.

The IDLE command is used on the caller's channel. The caller's channel enters an IDLE mode, and remains in that mode until call progress is complete on the associated channel.

The flowcharts in FIGS. 8 through 14 illustrate the process of conferencing a caller with an operator, and then with a selected destination party after the operator line is released, in accordance with the present invention. For illustrative purposes, a portion of the matrix code for implementing the present invention is provided in the microfiche appendix. This code is referenced periodically in the following discussion by matrix line numbers found in the Current Event column of each row. The matrix line numbers will be placed in parentheses in the text below, e.g., (line 14)".

The system comprises several telephone lines and is designed to process several calls at one time. A telephone line is coupled to the computer through a port via an LSI/120 board 30 or 32. As shown in block 140 of FIG. 8, a D/121 board 34 or 36 detects a call on an inbound trunk 20 as it is received through the corresponding LSI/120 board 30 or 32 that is interfaced with the trunk. The receiving D/121 board issues an interrupt to the PC. As indicated in blocks 142 and 144, the PC, in accordance with the matrix, instructs the D/121 board to transmit an off-hook signal and subsequently a pre-recorded message to the caller through the LSI/120 line on which the inbound call is received. The message instructs the caller to select self-service or operator assistance in placing a telephone call to a selected destination, hereinafter referred to as the destination party, as indicated by blocks 146 and 148. The caller requests self-service by pressing, for example, the "*" key on the telephone keypad. The PC is programmed by the matrix to interpret any other entry as a request for operator assistance.

If the caller desires self-service, he responds to the message in block 144 by entering "*" and the telephone number of the destination party followed by "#", as shown in block 150. The telephone number is generally received at the ARP 10 as DTMF signals although the system can be configured with speech recognition using matrix functions to process the caller's spoken words. The dialed DTMF signals are detected by the receiving D/121 board which sends an interrupt to the PC. The matrix instructs the PC microprocessor to respond to the interrupt by storing the dialed DTMF signals into one of the Z-switches, a part of PC memory that is dedicated for storing values and other uses during a telephone call. The DTMF signals are stored in a Z-switch associated with the inbound line (channel A). In accordance with the present invention, the ARP 10 proceeds to process the inbound call as limited in duration (i.e., a health and welfare call to a military base), as shown in block 152. This process is described in further detail below in connection with FIGS. 13 and 14.

Figure 8:
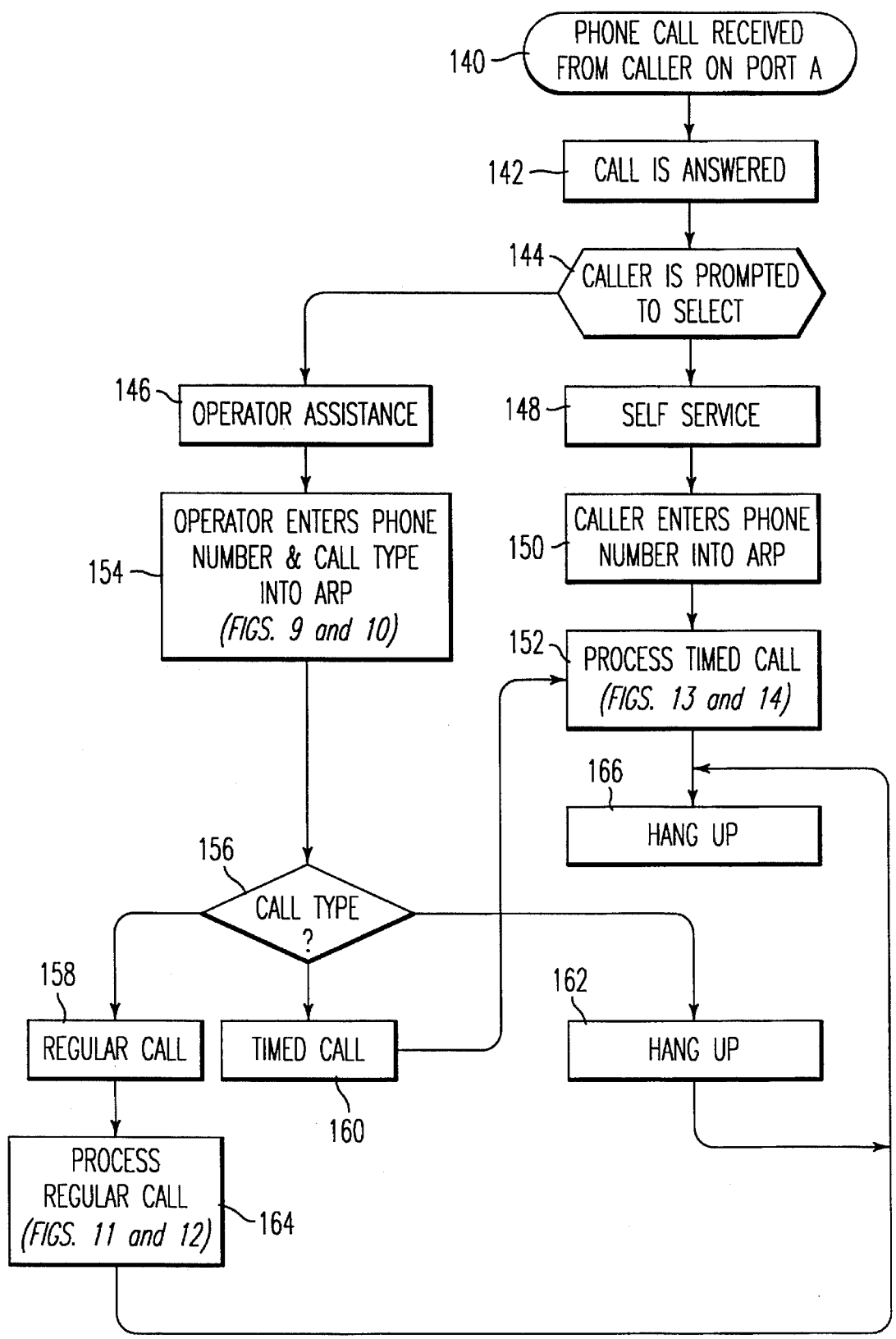
FIG. 8 is a flowchart depicting the overall sequence of operations for implementing the present invention.

With continued reference to FIG. 8, the PC microprocessor is instructed by the matrix to initiate a telephone call to an operator in response to a caller's request for operator assistance, as shown in blocks 146 and 154. A conference is subsequently established with an operator through an outdial port (i.e., available line on an LSI/120 board) in accordance with the flow charts described below in connection with FIGS. 9 and 10. Once a conference is established, the operator converses with the caller to determine if the caller desires a regular call of unlimited duration, a timed call (i.e., a health and welfare call for military personnel), or has hung up his telephone set, as indicated in blocks 156, 158, 160, 162 and 166. The manner in which the ARP 10 processes a regular call (block 164) is described below in connection with FIGS. 11 and 12.

Figure 9:
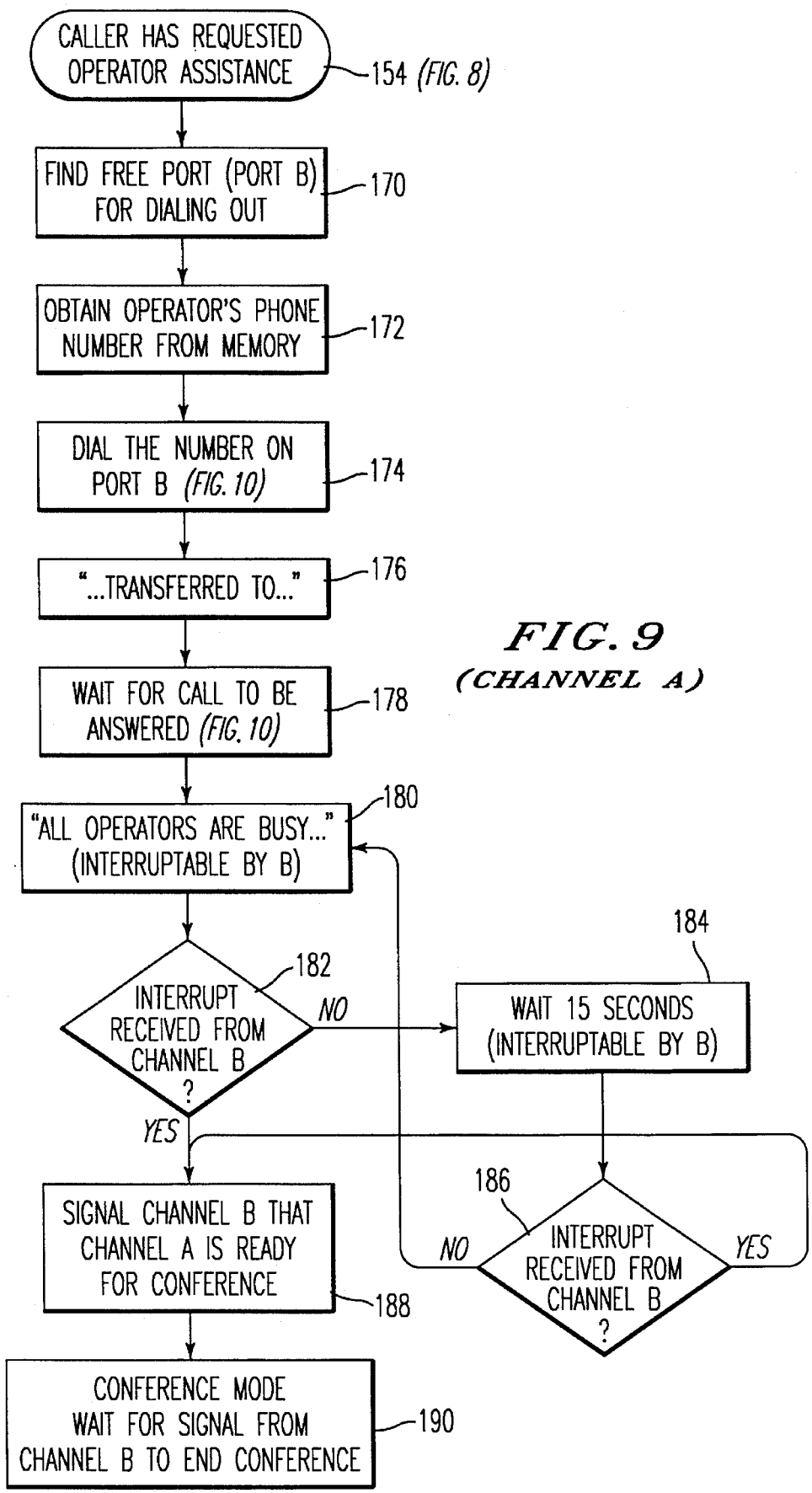
Figure 10A:
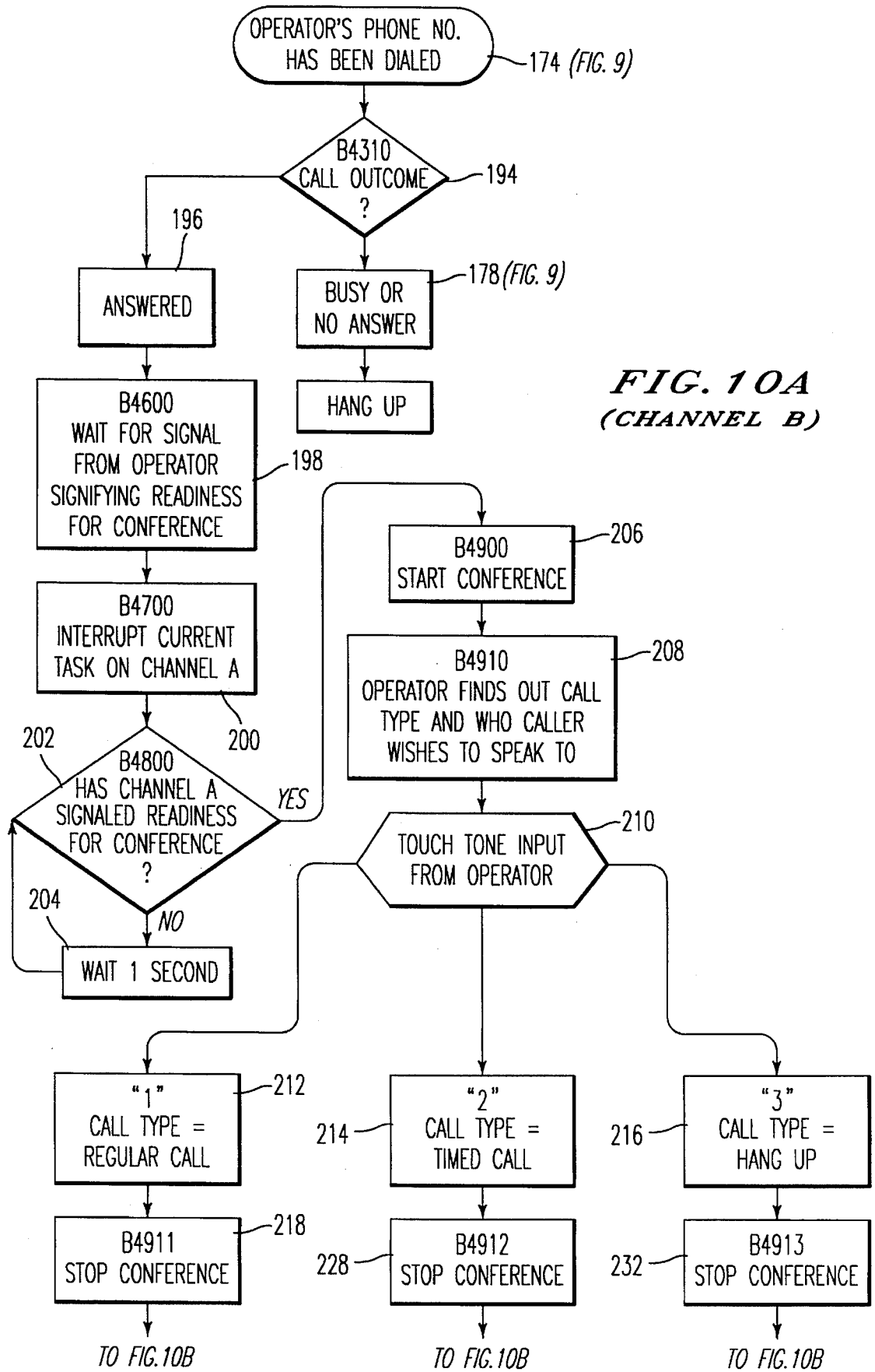
Figure 11:
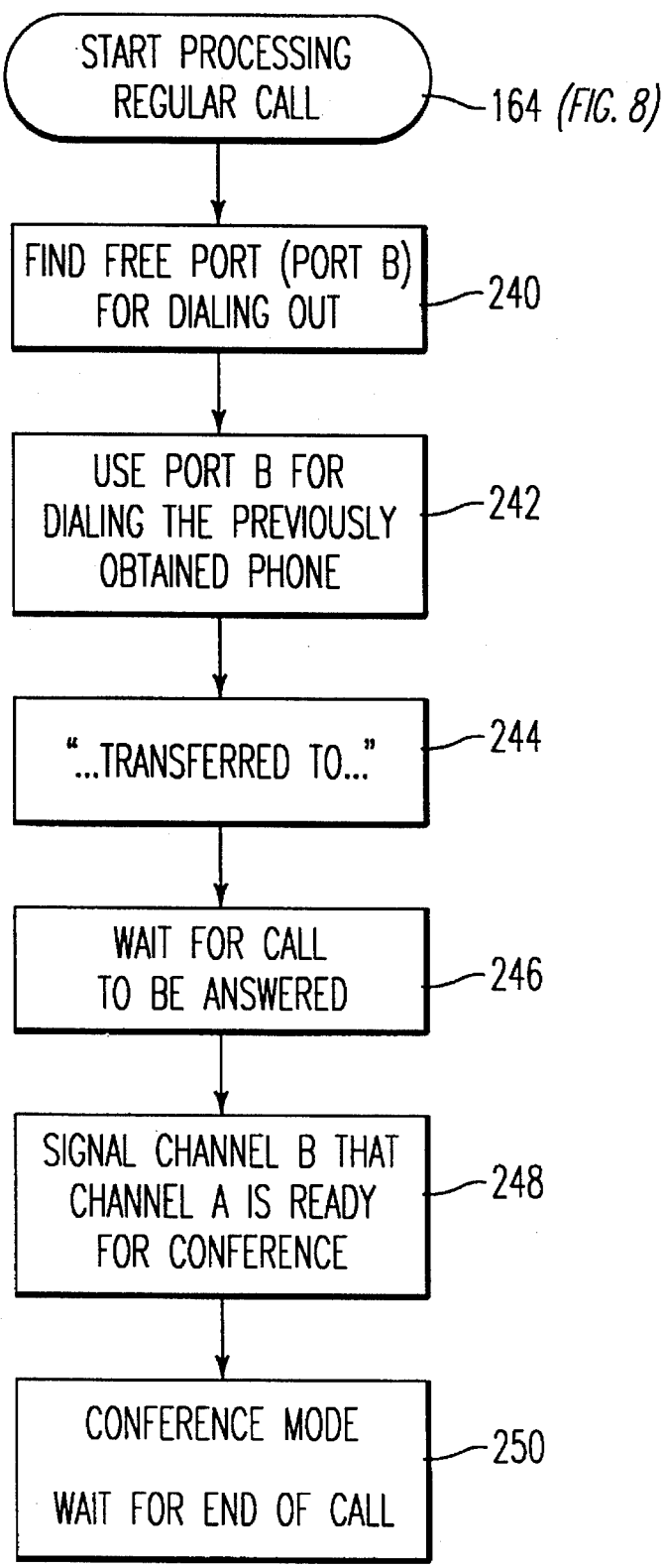
FIGS. 11 and 12 are flowcharts depicting the sequence of operations for processing a regular, untimed telephone call on inbound and outdial channels, respectively, in accordance with the present invention.
Figure 12:
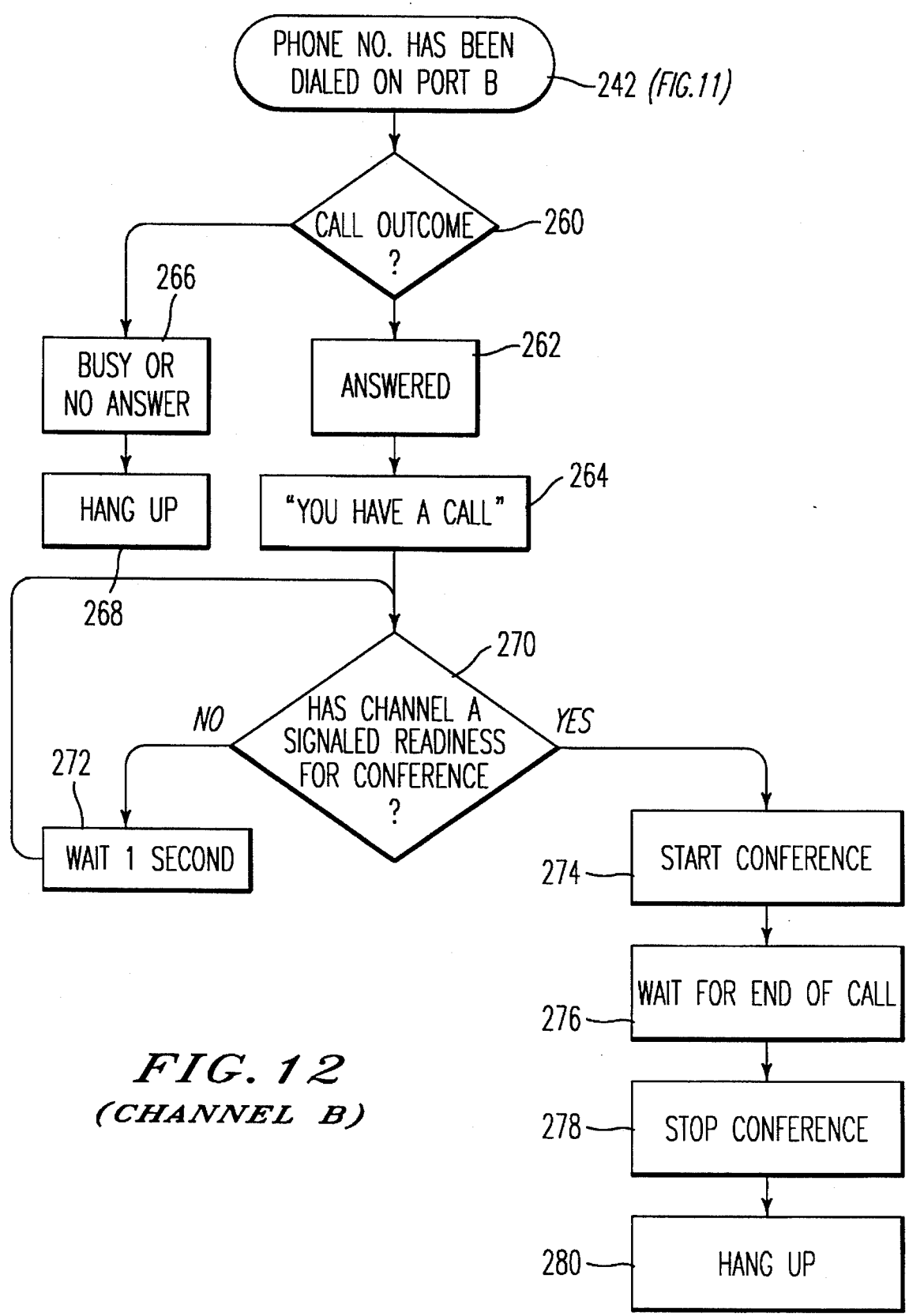

The PC RAM is provided with a software file containing operator telephone numbers which can be called to provide a caller with directory assistance through an outdial channel (block 154 of FIG. 8). FIGS. 9 and 10 illustrate, respectively, the call processing events associated with the inbound and outdial channels, hereinafter referred to as channels A and B, respectively, for rendering operator assistance.

As shown in blocks 170 and 172 of FIG. 9, the PC requests a port (i.e., a line coupled to an LSI/120 board) for outdialing in accordance with the OUTD ON command (line 16), and retrieves an operator's telephone number from the PC RAM. If an outdial port is found, the D/121 board places a channel (i.e., outdial channel) corresponding to the port in an off-hook state.

The PC microprocessor selects operator number dialing parameters in accordance with the OUTD ON matrix command (line 18), i.e., selects an external channel parameter block (CPB) and "&6" as the put-on-hold string. A CPB is a set of parameters which, among other things, define expected ring signals (cadence and frequency) for normal ringback, busy and intercepts. They are used by the drivers 114 and 116 to determine call outcome. Because there is no universal standard for these signals, separate CPBs are provided for transfers through the public telephone company (external transfers) and transfers through a PBX (internal transfers). Another CPB parameter is stdelay, which defines the time between issuing the dialing command and the start of the analysis for call outcome. The specified value should, in general be longer for external transfers than for internal ones. The name of the put-on-hold string derives from hook flash transfers. It is the command string which puts the caller on hold and gets a dial tone for dialing out. The same name is used even when the transfer is not through a hook flash. A typical command string for an internal transfer is "GO OFF HOOK, LOOK FOR Dial tone", and for an external transfer, "GO OFF HOOK, LOOK FOR Dial tone, DIAL 9 (FOR AN OUTSIDE LINE), LOOK FOR Dial tone".

If no dial tone is detected by the D/121 board, the PC instructs the D/121 board to return the channel to an on-hook condition. The PC microprocessor locates another port for dialing out.

If dial tone is detected, the D/121 board associated with the outdial port transmits the DTMF signals corresponding to the retrieved operator number on the outdial channel, as shown in block 174. As shown in block 176 of FIG. 9, the PC plays a message on channel A informing the caller that his call is being transferred to an operator (line 17, which branches to line 890). Meanwhile, the PC instructs the D/121 board associated with channel B to monitor the call progress on the outdial channel B in order to connect the operator to the ARP 10, as shown in block 178. Call progress refers generally to line conditions such as ring back, busy, connect and operator intercept.

The ability to set up a conference between an inbound line (i.e., the caller) and an outdial line (i.e., the operator) while playing a message to the caller on the incoming line is one of the advantages of the present invention. In conventional telecommunications systems which employ hook flash transfer, a separate line for outdialing is not available. Thus, a message cannot be played to a caller during the process of transferring his call to a destination party on an outgoing line. In these systems, a message would be played to the caller, and the call transfer process would be initiated thereafter. Thus, the total amount of time required to transfer a call is increased. The present invention reduces the delay associated with call transfer by the amount of time required to play the message.

With reference to block 178 of FIG. 9, the outdial line may be busy or may not be answered by the destination party. The D/121 board transmits status signals to the PC microprocessor regarding these line conditions. The PC can be programmed to play a message instructing the caller to call the ARP 10 again at a later time and then hangup. Alternatively, the PC can be programmed to play a message asking the caller if he would like to be queued for the re-dialing of the operator by the ARP 10.

As shown in block 180 of FIG. 9, outdial port can be configured to be transferred to an automated call distribution (ACD) system instead of being transferred directly to the operator, in accordance with one embodiment of the present invention. The ACD in turn transfers the call to the operator.

Thus, the ACD may increase the amount of time it takes for the operator to transfer the call. For this reason, the PC can be programmed to play a message notifying the caller that all operators are currently busy and an operator will help him in the order calls are received by the ACD. As shown in blocks 182, 184 and 186, this message is played on channel A until the PC places an interrupt on channel A signifying an operator has answered, as described below with reference to FIG. 10. The caller does not hear a message on channel B notifying the operator, for example, that a base is calling and instructing the operator to press a keypad button when he or she is ready to process the call (block 196 of FIG. 10). For example, the interrupt can be generated in accordance with a Dialogic D/121 board device driver command for CHANNEL STOP.

As stated previously, the Z-switch ZCOM is specified by the OUTD ON command as a set of cross-channel flags for conferencing between two channels (e.g., channels A and B). Upon receiving the interrupt on channel A, the PC is programmed to set a flag in the Z-switch for channel B to notify channel B that channel A is ready for conferencing, as shown in block 188. As shown in block 190, once conferencing between channels A and B (i.e., between the caller and the operator) is established, conferencing continues until the PC signals channel A via channel B to end the conference, as shown in, for example, block 218 of FIG. 10. Thus, the PC is programmed to use the Z-switches for sending handshaking signals between channels in order to synchronize communication therebetween.

The PC microprocessor monitors call progress on channel B to ascertain whether the operator answers, a busy signal is returned, or there is no answer, as shown in block 194 of FIG. 10. If the operator answers, the PC is programmed to play a message on channel B informing the operator, for example, that a call is going to be transferred from the military base or business where the ARP is located, as shown in block 196. The operator can be remotely located or co-located with the ARP as discussed above with FIG. 1. The call may be initially transferred to an ACD. In this case, a message is played on channel B until an operator responds. The message tells the operator to respond with a particular DTMF signal to signify that the operator is prepared to converse with the caller, as indicated in block 198. When the operator's response is detected by the D/121 board on channel B, the PC transmits an interrupt on channel A signifying channel B readiness for conferencing, as shown in block 200. The PC awaits the setting of the flag in block 188 (FIG. 9) before commencing conferencing between channels A and B, as indicated in blocks 202, 204 and 206.

The PC is programmed via the LINK ON command to initiate conferencing between channels A and B using the MSI board, as indicated by block 206. As discussed above in connection with block 154 of FIG. 8, the PC microprocessor 31 establishes conferencing between the channels of the associated ports (i.e., the inbound and outdial ports) after the operator has answered. Before conferencing, the microprocessor instructs the MSI board 38 to copy the communication switch ZCOM from channel A associated with the inbound port to channel B associated with the outdial port. In a two-party conference using the MSI board, the two parties may converse using channels A and B, while the ARP 10 can only monitor the associated channels to detect DTMF signals and audio noise or lack thereof. The ARP cannot play messages over the associated channels to one or both parties unless the parties are first de-conferenced.

The matrix instructs the PC microprocessor to establish and terminate conferencing using the LINK ON (line 110)

and LINK OFF commands, respectively. These commands cause the PC microprocessor to generate function calls to the device driver for the MSI board. The MSI board in turn begins and end conferencing between two selected channels in accordance with the driver (i.e., Dialogic commands ms_estconf and ms_delconf). As stated previously, when the inbound channel A is configured to be in an IDLE or CONFERENCE mode, it cannot be used for different matrix operations until it is taken out of CONFERENCE mode. The outdial channel B initiates the conference only after the inbound channel is placed in conference mode. This is ensured by the use of the ZCOM switch. While in the CONFERENCE mode, a channel A (i.e., the inbound channel) may be conferenced, but does not have to be conferenced. Dialogic software for the MSI board permits a channel B (i.e., the outdialing channel) to force the channel A out of the CONFERENCE mode by putting an appropriate event (i.e., a T_EOF event) in an event queue associated with the device driver.

While in CONFERENCE mode, the operator converses with the caller to determine whether the caller desires to make a regular (unlimited timed) call, a timed call (i.e., a health and welfare call) or whether the operator needs to terminate the call on the inbound line, as shown in block 208 of FIG. 10. Based on the caller's response, the operator enters a "1" for a regular call, a "2" for a timed call, or a "3" to hang up, as shown in blocks 210, 212, 214 and 216. These dialed DTMF signals are detected by the D/121 board that is processing channel B. The D/121 board transmits this information to the PC microprocessor. The PC microprocessor jumps to a different row (i.e., line 478, line 300 or line 920) in the matrix software in accordance with the caller's response.

To establish a regular call, the PC microprocessor instructs the MSI board to stop the conferencing between the ARP and the operator in accordance with a LINK OFF command (line 470), as indicated in block 218. The ability to suspend the conference spares the caller from having to listen to the operator's DTMF signal inputs, which are described below in connection with block 222. Without this feature, the caller would have to listen to these unpleasantly loud DTMF signals.

As shown in block 220, the PC microprocessor plays a message (line 478) to the operator on channel B instructing the operator to enter the number that he obtained by conversing with the caller (block 208). The call type and the number are in PC RAM (i.e., in a ZCOM communication switch) after they are stored entered by the operator. With reference to blocks 222 and 224, the call type and telephone number of the destination party are transferred to channel A in accordance with the OUTD OFF command (line 490). The OUTD OFF command is only issued to the channel associated with the outdial port. The command instructs the PC microprocessor to copy the ZCOM communications switch and the tone input (i.e., T>) from the outdial channel B to the inbound channel A. The inbound channel is no longer in a CONFERENCE mode. Accordingly, channels A and B are de-conferenced. The operator hangs up, and the call to the operator on channel B is terminated, as indicated in block 226.

The conference between the ARP and the operator is similarly terminated for a timed call (block 228) so that a message can be played to the operator (block 230). In both blocks 220 and 230, the operator has the option of pressing the "*" key to restart the conference with the caller. This may be necessary because the operator did not get all of the information necessary to transfer the caller's call to the destination party during their initial conversation. For call type "3" (i.e., hang up), the PC microprocessor 31 deconferences the ARP and the operator (block 232) before hanging up.

After the operator enters the telephone number of the party requested by the caller and hangs up (block 154 of FIG. 8), the ARP 10 begins to process the call. For a regular call (block 164 of FIG. 8), the process begins with the PC microprocessor 31 finding an available port (i.e., port B) for dialing out to the requested party, as indicated in block 240 of FIG. 11. As shown in block 242, the PC microprocessor transmits the destination party number in RAM from the tone buffer for channel A to the tone buffer for channel B. The D/121 board in turn sends corresponding DTMF signals to channel B if a dial tone is detected. If no dial tone is detected, the PC microprocessor instructs the D/121 board handling channel B to place channel B back on-hook, and initiates a search for another available port for outdialing in accordance with the matrix. Meanwhile, the PC microprocessor is programmed to send a message from PC RAM or disk to the caller over the inbound channel (channel A) to inform the caller that his call is being transferred to the requested destination party, as shown in block 244. The PC microprocessor monitors the call progress on the outdial channel the D/121 board that processes channel B in order to attempt to connect the destination party to the ARP 10, as shown in block 246. If the line is busy or not answered, the ARP instructs the caller to either hang up or be queued for later re-dialing of the destination party (block 178 of FIG. 9). The PC microprocessor, while processing channel A, sets a flag to notify channel B that channel A is ready for conferencing, as shown in block 248. As shown in block 250, once conferencing between channels A and B (i.e., between the caller and the destination party) is established, conferencing continues until channel B signals channel A to end the conference, as shown in block 250.

The process of establishing a regular (i.e., unlimited time duration) call with a destination party is similar to the process of dialing out to an operator described in connection with FIG. 10. As shown in block 260, the PC monitors channel B via the D/121 board that processes the outdial channel (channel B) for such conditions as busy, on-hook or off-hook. If the destination party answers, the PC is programmed to play a message on channel B informing the called party, for example, to please hold while a call is transferred from the military base or business where the ARP is located, as shown in blocks 262 and 264. The PC microprocessor hangs up channel B if the line is busy or the destination party does not answer, as indicated in lines 266 and 268. Channel B is conferenced with channel A once a signal is received indicating that channel A is ready for conferencing, as shown in blocks 270, 272 and 274. The PC microprocessor monitors the conference between the caller and the destination party until an on-hook is detected. The PC microprocessor, in accordance with the OUTD OFF command, then directs the D/121 board to terminate the conference and hang up, as shown in blocks 278 and 280.

The process of establishing a timed call is similar to the process described in connection with FIGS. 9 and 10. After the operator enters the telephone number of the party requested by the caller and hangs up (block 154 of FIG. 8), the ARP 10 begins to process the call. For a timed call (block 152 of FIG. 8), the process begins with the PC microprocessor finding an available outbound port for dialing out to the requested party, as indicated in block 284 of FIG. 13. As shown in block 286, the PC microprocessor 31 transmits the destination party number from RAM to the D/121 board handling the outdial channel (channel B). The PC microprocessor in turn sends corresponding DTMF signals to channel B if a dial tone is detected. If no dial tone is detected, the PC microprocessor instructs the D/121 board handling channel B to place channel B back on-hook, and initiates a search for another available port for outdialing. Meanwhile, the PC microprocessor is programmed to send a message from PC RAM to the caller over the inbound channel (channel A) to inform the caller that his call is limited to three minutes in duration and that he will receive a warning 30 seconds before the end of the call, as shown in blocks 288 and 290. The PC microprocessor uses the D/121 board that processes channel B to monitor call progress on the outdial channel in order to connect the destination party to the ARP 10, as shown in block 292. If the line is busy or the destination party does not answer, the ARP instructs the caller to either hang up or be queued for later re-dialing of the destination party (block 178 of FIG. 9).

Figure 13:
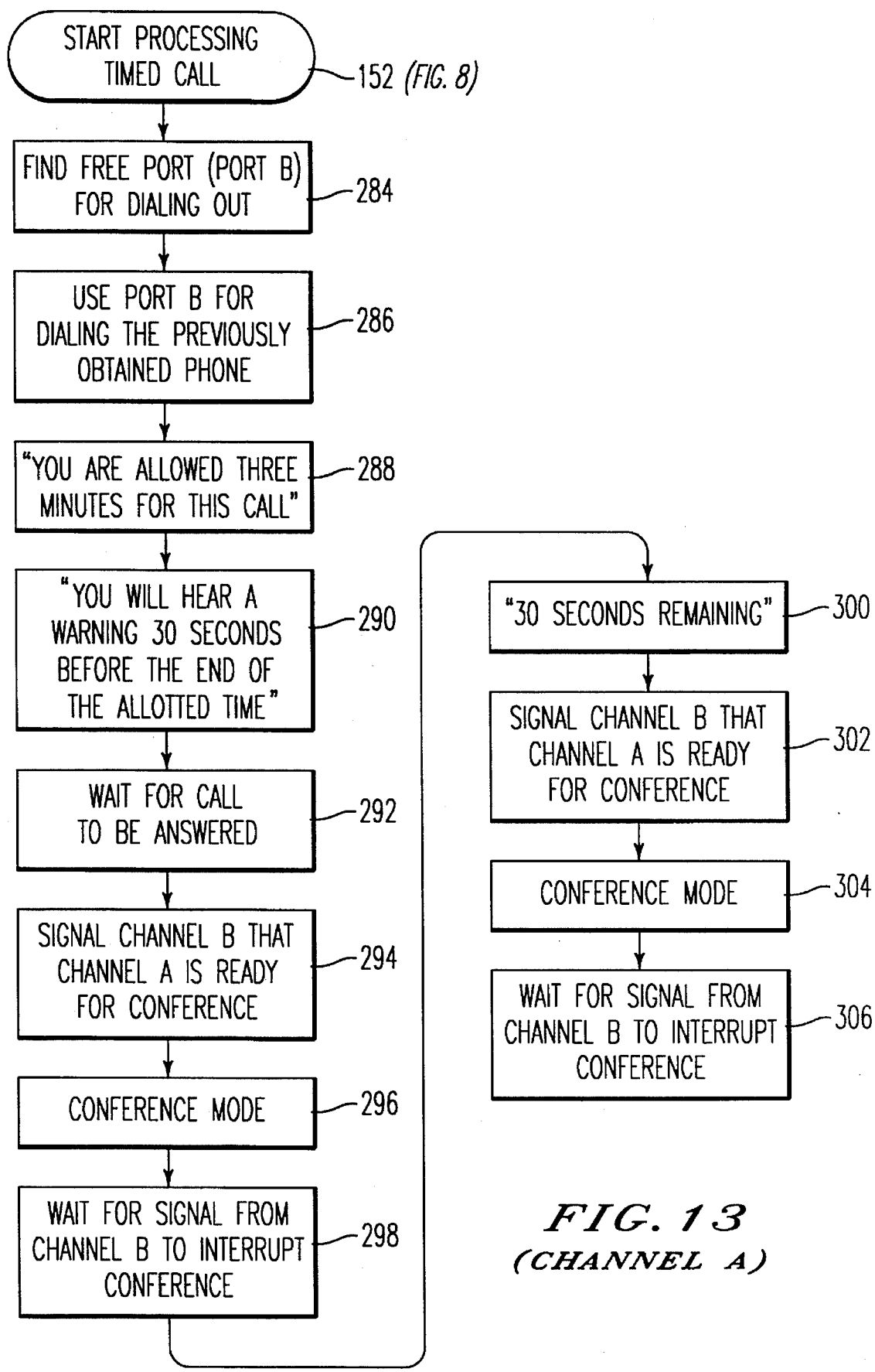
FIGS. 13 and 14 are flowcharts depicting the sequence of operations for processing a timed call using inbound and outdial channels, respectively, in accordance with the present invention.

With continued reference to FIG. 13, the PC microprocessor, while controlling channel A, sets a flag to notify channel B that channel A is ready for conferencing, as shown in block 294. As shown in block 296, conferencing between channels A and B (i.e., between the caller and the destination party) is established and continues until channel A is provided with a signal signifying the temporary suspension of the conference (i.e., as the result of the PC microprocessor executing a LINK OFF command), as shown in block 298. The channels are deconferenced in order to play a message to the caller on channel A and the destination party on channel B that only 30 seconds remain in the conversation, as indicated in block 300. As shown in block 302, the PC microprocessor, while processing channel A, transmits a signal on channel B after the message has been played. The PC microprocessor thereafter transmits a signal to channel A signifying that the conference will be resumed, as shown in block 304. The conference between channels A and B continues until channel B transmits a signal to channel A signifying the end of the conference, as well as the call, as shown in block 306.

Figure 14:
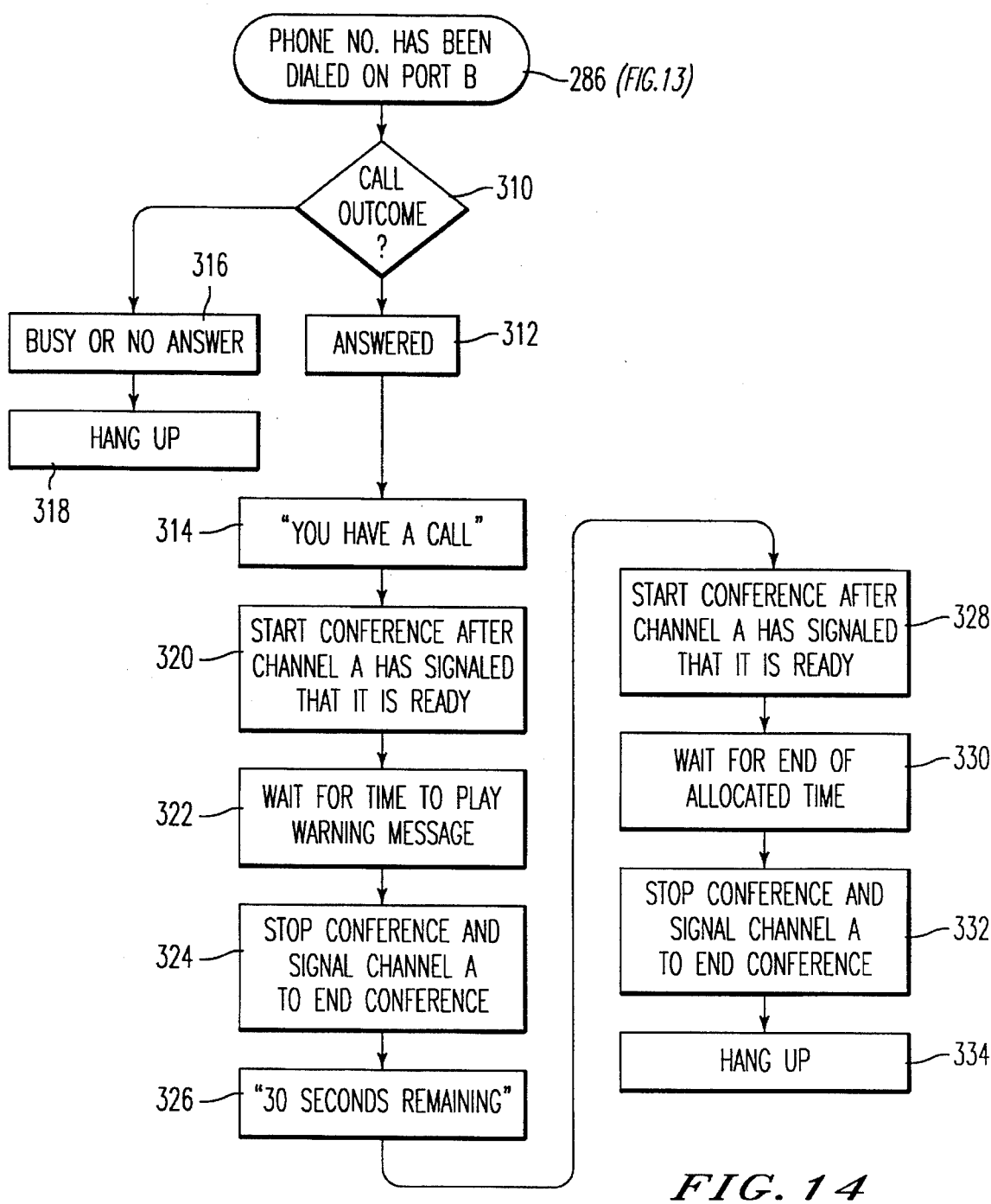

As shown in block 310 of FIG. 14, the PC microprocessor monitors channel B for such conditions as busy, on-hook or off-hook. If the destination party answers, the PC is programmed to play a message on channel B informing the called party, for example, to please hold while a call is transferred from the military base or business where the ARP is located, as shown in blocks 312 and 314. The PC microprocessor hangs up channel B if the line is busy or the destination party does not answer, as indicated in blocks 316 and 318. The PC microprocessor begins conferencing with channel A once a signal is received indicating that channel A is ready for conferencing, as shown in block 320. With reference to block 322, the PC microprocessor suspends further processing until the warning messages to the caller (blocks 288 and 290) have been played. The PC microprocessor monitors the length of the call using a counter. The PC microprocessor then signals channel A to suspend the conference when only 30 seconds remain in the conversation in order to transmit a warning message to the caller on channel A (line 370) and the destination party on channel B (line 600), as shown in blocks 324 and 326. The PC microprocessor resumes the conference when a signal is sent from channel A to channel B signifying that channel A is ready for conferencing, as shown in block 328. The PC microprocessor terminates the conference when the three minute call time duration is exceeded, as shown in blocks 330 and 332, and hangs up, as shown in block 334.

The present invention has many advantages over conventional hook flash systems. The ARP can be programmed to monitor the duration of telephone calls, and to play a message to the caller as a transfer to a called party (i.e., an operator or selected destination party) is in progress. Since the caller and called party are conferenced through separate ports in the ARP, the parties can receive different messages, as indicated in blocks 180 and 198 of FIGS. 9 and 10, respectively. Also, many private branch exchanges are not configured with an RLT feature. (The RLT feature of the invention is demonstrated by the arrows emanating from blocks 158, 160 and 162 in FIG. 8.) In other words, many PBXs are not configured to receive a call on one port, to allow the caller to speak with someone (i.e., an operator) through a second port, and to conference the caller with a third party through the second or a third port after releasing the operator. In this example, the PBX would most likely terminate the incoming call after the second party (i.e., the operator) terminates the call by hanging up the telephone.

The foregoing detailed description is illustrative of various preferred embodiments of the present invention. It will be appreciated that numerous variations and changes can be made thereto without departing from the scope of the invention as defined in the accompanying claims.

What is claimed is:

1. A telecommunications system for establishing a telephone conference between a caller on an incoming telephone line to said system and a called party on an outgoing telephone line from said system without requiring a private branch exchange, comprising;

a programmable processor;

a memory device coupled to said processor comprising a first memory location for storing data relating to said incoming line and a second memory location for storing data relating to said outgoing line; and interface means for interfacing said processor with said incoming and outgoing lines;

wherein said processor is operable to detect and answer a telephone call on said incoming line to determine the identity of said called party from said caller, to establish a telephone call on said outgoing line by dialing a telephone number corresponding to said called party, and to generate handshaking signals for storage in said first memory location and said second memory location of said memory device corresponding to said incoming and outgoing lines for conferencing said incoming and outgoing lines.

2. A method for establishing a telephone conference between two of a plurality of telephone lines without requiring a private branch exchange, the method comprising the steps of:

monitoring the progress of calls on each of said plurality of lines and storing corresponding status data in a memory device;

detecting an incoming call from a caller on a first line of said plurality of lines;

processing said incoming call to obtain data from said caller specifying a called party;

using said status data, locating from among said plurality of lines a second line that is available for an outgoing call;

establishing said outgoing call to said called party by dialing a telephone number corresponding to said called party on said second line;

generating a first handshaking signal signifying that said outgoing call was answered by said called party and the readiness of said second line for conferencing;

storing said first handshaking signal in a first memory location of a memory device assigned to store data relating to said first line;

generating a second handshaking signal signifying readiness of said first line for conferencing;

storing said second handshaking signal in a second memory location of said memory device assigned to store data relating to said second line; and conferencing said caller and said called party using said first and said second lines.

3. A method as claimed in claim 2, wherein said step of establishing an outgoing call comprises the step of playing a message to said caller on said first line.

4. A method as claimed in claim 3, wherein the dialing of said telephone number and the playing of said message occur substantially simultaneously.

5. A method as claimed in claim 3, wherein said message notifies said caller that said caller is being conferenced with said called party.

6. A method as claimed in claim 3, wherein said step of establishing an outgoing call further comprises the steps of:

detecting at least one of a group of line conditions comprising no answer and busy on said second line; and playing a second message on said first line to instruct said caller on how to proceed.

7. A method as claimed in claim 6, wherein said second message notifies said caller to call again at a later time and to hang up.

8. A method as claimed in claim 6, wherein said second message notifies said caller to remain on said first line while an attempt to establish another outgoing call is made at a subsequent time.

9. A method as claimed in claim 2, wherein said establishing step comprises the step of playing a message on said second line when said called party answers said outgoing call to notify said called party of the source of said outgoing call.

10. A method as claimed in claim 2, wherein said step for establishing an outgoing call comprises the steps of:

playing a first message on said second line repeatedly until said outgoing call is answered, said first message requesting a selected response from said called party; and playing a second message on said first line repeatedly during said playing of said first message until said selected response is detected.

11. A method as claimed in claim 10, wherein said step for establishing an outgoing call further comprises the steps of:

detecting said selected response on said second line; and interrupting said playing of said second message on said first line.

12. A method as claimed in claim 2, further comprising the steps of:

generating a third handshaking signal signifying termination of said conferencing;

storing said third handshaking signal in said first memory location of said memory device; and deconferencing said first line and said second line after said third handshaking signal is read from said memory device.

13. A method as claimed in claim 2, further comprising the step of terminating said outgoing call to said called party via said second line while continuing said incoming call from said caller on said first line.

14. A method as claimed in claim 2, wherein said called party can selectively deconference said first line and said second line, and selectively resume said conferencing.

15. The method as claimed in claim 2, wherein said conferencing step comprises the step of selectively interrupting said conferencing step to play a message on at least one of said first line and said second line.

16. The method as claimed in claim 15, wherein different messages are played substantially simultaneously on said first line and said second line.

17. A method as claimed in claim 2, further comprising the steps of:

obtaining verbal information from said caller during said conferencing step;

deconferencing said first line and said second line;

transmitting signals relating to said verbal information on said second line;

storing caller data corresponding to said signals; and terminating said outgoing call to said called party via said second line while continuing the processing of said incoming call from said caller on said first line.

18. A method as claimed in claim 17, wherein said signals are dual-tone multifrequency signals.

19. A method as claimed in claim 17, wherein said transmitting step comprises the step of playing a message on said second line instructing said called party to generate said signals.

20. A method as claimed in claim 17, wherein said caller data comprises data relating to a third party with whom said caller requests conferencing.

21. A method as claimed in claim 20, further comprising the steps of:

locating from among said plurality of lines another line that is available for an outgoing call;

establishing said outgoing call to said third party on said third line using said caller data; and conferencing said first line and said third line when said third party answers said outgoing call.

22. A method as claimed in claim 21, wherein said step of establishing an outgoing call on said third line comprises the steps of dialing a telephone number corresponding to said third party on said third line, and substantially simultaneously playing a message to said caller on said first line.

23. A method as claimed in claim 21, wherein said step of establishing said outgoing call on said third line comprises the step of playing a message on said third line to inform said third party that said party will be conferenced with said caller.

24. A method as claimed in claim 21, wherein said third line is any one of said plurality of lines except said first line.

25. A method as claimed in claim 21, wherein said step of conferencing said first line and said third line comprises the steps of:

interrupting processing of said incoming call on said first line;

generating a third handshaking signal signifying readiness of said first line for conferencing, and storing said first handshaking signal in a third location of a memory device assigned to store data relating to said third line; and commencing conferencing of said first line and said third line after said third handshaking signal is read from said memory device.

26. A method as claimed in claim 25, further comprising the steps of:

generating a fourth handshaking signal signifying termination of said conferencing, and storing said fourth handshaking signal in said first memory location of said memory device; and deconferencing said first line and said third line after said fourth handshaking signal is read from said memory device.

27. A method as claimed in claim 21, further comprising the steps of:

determining the duration of said conferencing of said first line and said third line; and terminating said outgoing call and said incoming call when said duration exceeds a predetermined amount of time.

28. A method as claimed in claim 21, further comprising the steps of:

playing a message on said first line informing said caller that said conferencing is limited in time duration during said step for establishing said outgoing call to said third party;

deconferencing said first line and said second line;

playing a message on said first line and said third line to provide a warning when said limited time duration has almost expired;

reconferencing said first line and said second line;

deconferencing said first line and said third line when said limited time duration has expired; and terminating said incoming call and said outgoing call.

* * * * *